United States Patent [19]

Sheridan

[11] 4,426,138
[45] Jan. 17, 1984

[54] HEAD POSITIONING DEVICE
[76] Inventor: John J. Sheridan, 1551 Calhoun St., New Orleans, La. 71108
[21] Appl. No.: 296,887
[22] Filed: Aug. 27, 1981
[51] Int. Cl.³ ............................ G02C 1/08; G02C 1/00
[52] U.S. Cl. ...................................... 351/158; 351/111
[58] Field of Search ................... 351/111, 158; 33/391

[56] References Cited
U.S. PATENT DOCUMENTS
2,068,103 1/1937 Harris .............................. 351/158 X Primary Examiner—John K. Corbin
Assistant Examiner—Rodney B. Bovernick

[57] ABSTRACT

A head positioning device for establishing a selected spacial attitude of the head for portraits, cephalometric x-rays and conventional x-rays in orthodontic procedures, which device includes eyeglasses having a lens frame and a pair of temple arms extending rearwardly of the lens frame in conventional fashion, and a pair of level tubes pivotally attached to mounts extending downwardly from the temple arms. The level tubes can be pivotally adjusted with respect to the eyeglasses to facilitate a desired constant head position when a patient is wearing the eyeglasses in order to insure duplicate full face, profile and/or x-ray pictures of the mouth and head which are necessary to insure proper diagnosis, treatment and care. In a preferred embodiment of the invention all components of the head positioning device are shaped from a clear material, and most preferably, from a polycarbonate composition.

10 Claims, 6 Drawing Figures

HEAD POSITIONING DEVICE

BACKGROUND OF THE INVENTION

1. Field of the Invention

This invention relates to cephalometry, and more particularly, to a device for insuring that the head of a patient is maintained in a desired spatial attitude or position during full face and profile portraits, cephalometric and routine x-ray procedures. The head positioning device of this invention includes a pair of eyeglasses having a lens frame with temple arms attached to the frame and provided with a pair of levels which are pivotally-mounted for adjustment with respect to the temple arms and lens frame. The levels can be pivoted to correspond to a selected plane such as the Frankford horizontal, alartragus, outer canthusporion, or other desired plane, and the patient's head can be placed and maintained in an attitude corresponding to the appropriate plane selection while successive full face, profile and/or cephalometric x-ray pictures are made. In a preferred embodiment of the invention the head positioning eyeglasses are shaped from a clear material such as polycarbonate to enable cephalometric x-rays to be made with the device in position on a patient's head without obscuring any landmarks. When portraits are made, the head can be initially spatially oriented with the head positioning device in place, and the device can then be removed to permit full face or profile portraits to be made.

2. Description of the Prior Art

Devices for orienting the head in a desired position or attitude for various purposes are known in the art. U.S. Pat. No. 2,932,303 to L. L. Smith discloses a "Head Leveling and Holding Device" for maintaining the head in a level configuration to facilitate cutting the hair in the then popular "flat-top" haircut. The device includes a pair of companion arms positioned to the left and right of the head, respectively, and a harness arrangement for attaching the arms to the head of a user and maintaining the arms in a substantially perpendicular configuration. A "Dental Level" for the head of a dental patient is disclosed in U.S. Pat. No. 1,576,260, to Harry F. Waite, which device includes a mouth piece having an attached bubble level for effecting the desired head orientation. U.S. Pat. No. 2,068,103 to M. H. Harris discloses a "Spectacle Level" which can be removably fitted to the lens frame of glasses to determine the attitude of the glasses across the face, from eye to eye.

Portraits and cephalometric x-rays for use in orthodontal care and treatment are generally undertaken by initially adjusting the patients head to a desired spatial orientation and subsequently taking the necessary pictures after asking the patient to maintain his head in the original position. Under circumstances where several pictures are to be made, or in cases where the patient is physically unable to maintain his head in a substantially motionless position for a sufficient time period to complete the pictures, the desired x-rays or portraits may not be of a sufficiently high quality for use in subsequent treatment or care. A key factor in obtaining quality photographs and cephalometric x-rays is the essentially motion-free, identical spatial orientation of the head for each picture.

Accordingly, it is an object of this invention to provide a head positioning device which includes eyeglasses provided with level means for determining a selected spatial orientation of the head in order to facilitate high quality portraits and cephalometric x-rays.

Another object of the invention is to provide a new and improved device for enabling one to maintain a desired spatial attitude of the head, which device is characterized by a pair of eyeglasses and at least one level pivotally mounted on the eyeglasses for determining a selected plane for orienting the head in orthodontal and dental treatment and care.

Yet another object of the invention is to provide a device for spatially orienting the head of an orthodontal or dental patient according to a selected standard and enabling the patient to substantially maintain the initial orientation in order to facilitate full face and profile portraits and cephalometric x-ray pictures of the patient's head.

A still further object of the invention is to provide a head positioning device for effecting a desired spatial orientation of the head about the two horizontal axes during successive portrait and/or cephalometric x-ray pictures, which device is characterized by a pair of eyeglasses having a lens frame and temple arms attached to the lens frame, with a pair of sealed level tubes containing a liquid and a bubble pivotally attached to the temple arms for indicating a selected orientation of the head.

SUMMARY OF THE INVENTION

These and other objects of the invention are provided in a head positioning device for determining and indicating a spatial orientation of a persons head, which device includes a pair of eyeglasses having a lens frame and temple arms attached to the lens frame, and further characterized by a pair of sealed level tubes containing a liquid and an air bubble, and pivotally mounted on a mount plate attached to the temple arms. In a preferred embodiment of the invention the level tubes are also fitted with a level arm extending forward and rearwardly of the tubes, and companion bubble alignment marks to more easily establish and maintain the desired head orientation along a specified plane.

BRIEF DESCRIPTION OF THE DRAWINGS

The invention will be better understood by reference to the accompanying drawings, wherein.

DESCRIPTION OF THE PREFERRED EMBODIMENTS

Figure 1:
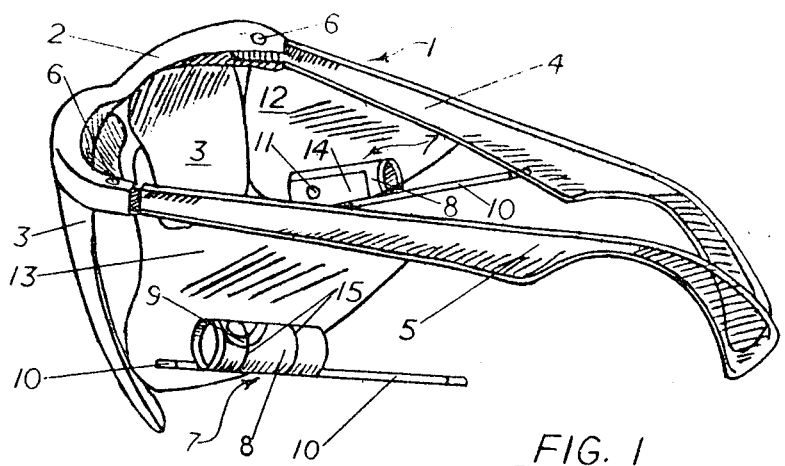
FIG. 1 is a perspective view of the head positioning eyeglasses device of this invention.
Figure 2:
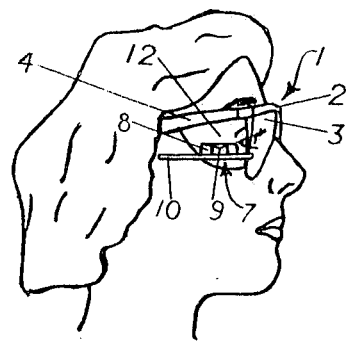
FIG. 2 is a right side elevation of the head positioning device in functional position on the head of a user.
Figure 3:
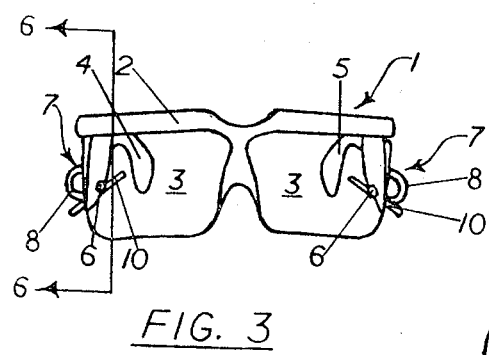
FIG. 3 is a front elevation of the head positioning device.

Referring to FIGS. 1 and 2 of the drawing, a preferred embodiment of the head positioning device of this invention is generally indicated by reference numeral 1, and includes eyeglasses having a lens frame 2 with optional lenses 3, a right temple arm 4 and a left temple arm 5. Optional temple arm pins 6 are provided in lens frame 2 to permit right temple arm 4 and left temple arm 5 to fold against lens frame 2. However, it will be appreciated by those skilled in the art that right temple arm 4 and left temple arm 5 need not necessarily fold against lens frame 2, and temple arm pin 6 can be omitted from head leveling device 1, as desired. It will be further appreciated that the primary function of lens frame 2 is to permit the eyeglasses to be securely positioned on the head, as illustrated in FIG. 2. Accordingly, lenses 3 need not be present in lense frame 2 in order that the head positioning device 1 perform its intended function.

Figure 4:
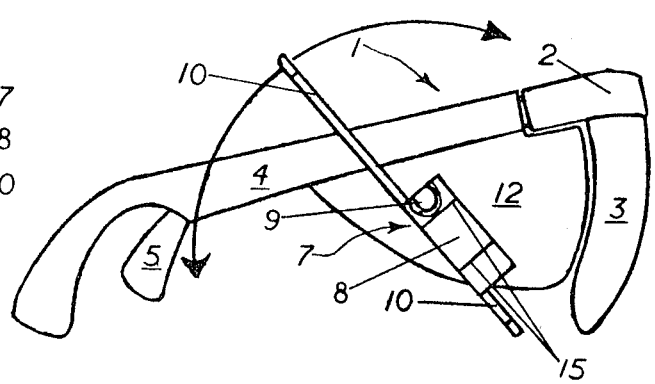
FIG. 4 is a right side elevation of the head positioning eyeglasses device, more particularly illustrating the pivoting function of the level assembly.
Figure 5:
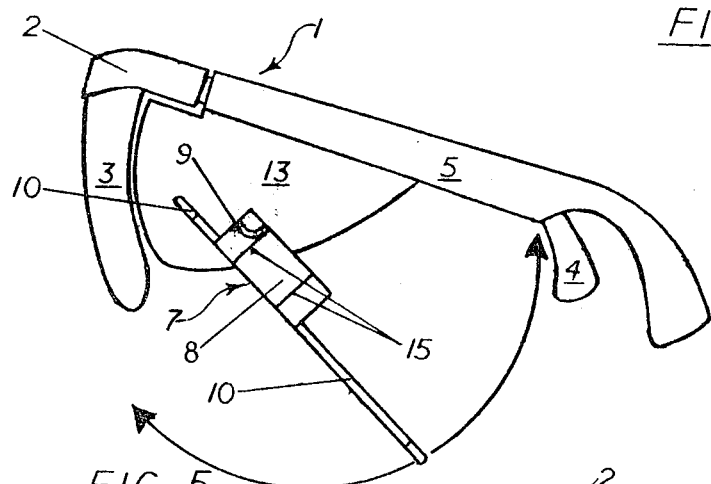
FIG. 5 is a left side elevation of the device.
Figure 6:
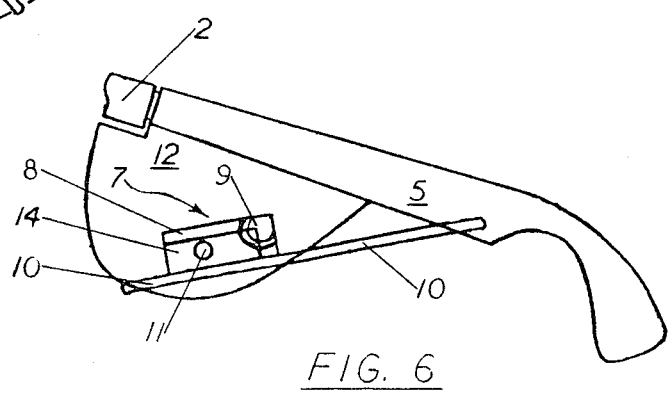
FIG. 6 is a sectional view, taken aong lines 6—6 in FIG. 3, of a temple arm, level mount and level assembly of the head positioning device.

In a preferred embodiment of the invention, and referring now to FIGS. 1–6, right temple arm 4 of head positioning device 1 is provided with a downwardly extending right level mount 12, and left temple arm 5 is fitted with a similar left level mount 13, as illustrated. A level assembly 7 is pivotally mounted on the right level mount 12 and left level mount 13, respectively, by means of level mount pins 11, as is more particularly illustrated in FIG. 6. In a most preferred embodiment of the invention the pivoting function of level assembly 7 with respect to right level mount 12 and left level mount 13 is facilitated by level mount blocks 14, which are attached to each of the level tubes 8, and carry the level mount pins 11. Level tubes 8 are sealed at each end and contain a quantity of liquid and a bubble 9, which bubble 9 traverses the interior of the level tubes 8 responsive to the spatial orientation of level tubes 8, as illustrated in FIGS. 4–6. Bubble alignment marks 15 are provided in spaced relationship on level tube 8 to indicate when level tube 8 is horizontally level. In another most preferred embodiment, a level arm 10 is also attached to the bottom of each level tube 8, and extends past the front and rear of each level tube 8 to more accurately align the level tube 8 with a desired plane in the course of utilizing the head positioning device 1 to properly orient a person's head, as hereinafter described. As illustrated in FIGS. 4 and 5, each level assembly 7 can be pivoted in a 360 degree circle on level mount pin 11, as indicated by the arrows.

In operation, and referring again to FIGS. 2, 4 and 5 of the drawing, the head positioning device 1 is placed on a user or patient's head, as illustrated in FIG. 2. Level tubes 8 are then pivoted on level mount pins 11 to align level arms 10 with a selected plane about the longitudinal axis of the head, such as the Frankford horizontal, alartragus, outer canthus porion or other desired plane, and the patient's head is appropriately oriented to center the bubbles 9 in the level tubes 8. The patient's head can also be adjusted from side to side about a transverse axis which is horizontally perpendicular to the longitudinal axis, by observing when each bubble 9 is centered transversely inside each respective level tube 8. This attitude of the head permits proper cephalometric x-rays and portraits to be made on a continuing basis, with the head maintained in the proper spatial attitude or position by the observation of bubbles 9.

In similar manner, under circumstances where full face and profile portraits are to be made, the head positioning device is placed on the head and the head is appropriately oriented. The level tubes 8 are then manipulated and pivoted on right level mount 12 and left level mount 13, respectively, to orient bubbles 9 in the center of level tubes 8, respectively. The original head position can then be maintained by the patient, the device removed, and the portrait or portraits made, as necessary. A periodic check on the orientation of the patient's head can be made by occasionally replacing the head positioning device 1 on the head, as desired. In this regard, an important aspect of the head positioning device 1 is a relatively tight, yet easily rotatable fit between each level assembly 7 and the right level mount 12 and left level mount 13, respectively. This tight, yet adjustable fit permits repetitive checking of an original head orientation during portraits without maladjustment of each level assembly 7, and yet it permits ready adjustment to other selected planes.

Another important embodiment of the invention is the manufacture of head positioning device 1 from a clear material which allows visual alignment of the level tubes 8 and level arms 10 with specific planes, and which will not interfere with the passage of x-rays during cephalometric pictures or obscure any landmarks on the patient's face and head. A most preferred material for manufacture is polycarbonate, which is easily molded, resists scratching and scuffing, and does not interfere with the passage of x-rays.

While the preferred embodiment of this invention have been described above, it will be recognized and understood that various modifications may be made therein, and the appended claims are intended to cover all such modifications which may fall within the spirit and scope of the invention.

Having described my invention with the particularity set forth above, what is claimed is:

1. A head positioning device comprising:
    (a) eyeglasses having a lens frame and rearwardly extending temple arms; and
    (b) at least one level indicating means pivotally carried by at least one of said temple arms and pivotally adjustable with respect to said temple arms to facilitate a desired spatial attitude of the head when said eyeglasses are worn by a user.

2. The head positioning device of claim 1 wherein said at least one level indicating means is a level tube pivotally carried by each of said temple arms.

3. The head positioning device of claim 2 further comprising a pair of level mounts attached to said temple arms and extending downwardly in essentially parallel relationship when said temple arms are rearwardly disposed in functional configuration, and said level tube is pivotally carried by each of said level mounts.

4. The head positioning device of claim 1 wherein said level indicating means is further characterized by a pair of sealed, tubular capsules, each of said capsules partially filled with a liquid and containing an air bubble and bubble alignment marks for indicating the relative attitude of said capsules, and a level arm attached to said capsules for pivotally manipulating said capsules and aligning said capsules with a selected plane.

5. The head positioning device of claim 4 further comprising a pair of level mounts attached to said temple arms and extending downwardly in essentially parallel relationship when said temple arms are rearwardly disposed in functional configuration, and said tubular capsules are pivotally carried by said level mounts.

6. The head positioning device of claim 5 further comprising temple arm pins cooperating with said lens frame and said temple arms for selectively folding said temple arms adjacent said lens frame.

7. A head positioning device for indicating a spatial orientation of the head about the longitudinal horizontal axis and an axis transverse to the longitudinal axis; comprising:

(a) eyeglasses having a lens frame and rearwardly-extending temple arms;
(b) a pair of generally flat level mounts carried by said temple arms and extending downwardly from said temple arms in essentially parallel relationship when said temple arms are rearwardly disposed in functional configuration;
(c) a pair of sealed capsules pivotally carried by said level mounts and containing a liquid and a bubble for indicating the relative position of said capsules with respect to the horizontal; and
(d) an elongated level arm attached to said capsules for aligning said capsules with a selected plane and orienting the head to conform to the plane.

8. The head positioning device of claim 7 further comprising bubble alignment marks in spaced relationship on said capsules for indicating horizontal orientation of said capsules.

9. The head positioning device of claim 7 further comprising temple arms pins cooperating with said lens frame and said temple arms for selectively folding said temple arms adjacent said lens frame.

10. The head positioning device of claim 7 further comprising:
(a) bubble alignment marks in spaced relationship on said capsules for indicating horizontal orientation of said capsules; and
(b) temple arm pins cooperating with said lens frame and said temple arms for selectively folding said temple arms adjacent said lens frame.

* * * * *